US011818155B2

(12) United States Patent
Cobb et al.

(10) Patent No.: US 11,818,155 B2
(45) Date of Patent: *Nov. 14, 2023

(54) COGNITIVE INFORMATION SECURITY USING A BEHAVIOR RECOGNITION SYSTEM

(71) Applicant: Intellective Ai, Inc., Dallas, TX (US)

(72) Inventors: Wesley Kenneth Cobb, The Woodlands, TX (US); Ming-Jung Seow, The Woodlands, TX (US); Curtis Edward Cole, Jr., Spring, TX (US); Cody Shay Falcon, Katy, TX (US); Benjamin A. Konosky, Friendswood, TX (US); Charles Richard Morgan, Katy, TX (US); Aaron Poffenberger, Houston, TX (US); Thong Toan Nguyen, Richmond, TX (US)

(73) Assignee: Intellective Ai, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/568,399

(22) Filed: Jan. 4, 2022

(65) Prior Publication Data

US 2022/0150267 A1     May 12, 2022

Related U.S. Application Data

(63) Continuation of application No. 16/945,087, filed on Jul. 31, 2020, now abandoned, which is a
(Continued)

(51) Int. Cl.
*H04L 9/40*     (2022.01)
*G06N 20/00*     (2019.01)
(Continued)

(52) U.S. Cl.
CPC ........ *H04L 63/1425* (2013.01); *G06F 40/226* (2020.01); *G06F 40/242* (2020.01);
(Continued)

(58) Field of Classification Search
CPC ............. H04L 63/1425; H04L 63/1408; G06F 17/2725; G06F 17/2775; G06F 17/2735; G06F 17/277; G06F 17/28; G06N 99/005
See application file for complete search history.

(56) References Cited

U.S. PATENT DOCUMENTS

| 4,679,077 A | 7/1987 | Yuasa et al. |
| 5,113,507 A | 5/1992 | Jaeckel |

(Continued)

FOREIGN PATENT DOCUMENTS

| CN | 1223410 A | 7/1999 |
| CN | 1276077 A | 12/2000 |

(Continued)

OTHER PUBLICATIONS

Apewokin et al. "Multimodal Mean Adaptive Backgrounding for Embedded Real-Time Video Surveillance," Jun. 2007, IEEE 6 pages, Minneapolis, MN.
(Continued)

*Primary Examiner* — Stephen T Gundry
(74) *Attorney, Agent, or Firm* — COOLEY LLP

(57) ABSTRACT

Embodiments presented herein describe a method for processing streams of data of one or more networked computer systems. According to one embodiment of the present disclosure, an ordered stream of normalized vectors corresponding to information security data obtained from one or more sensors monitoring a computer network is received. A neuro-linguistic model of the information security data is generated by clustering the ordered stream of vectors and assigning a letter to each cluster, outputting an ordered
(Continued)

sequence of letters based on a mapping of the ordered stream of normalized vectors to the clusters, building a dictionary of words from of the ordered output of letters, outputting an ordered stream of words based on the ordered output of letters, and generating a plurality of phrases based on the ordered output of words.

18 Claims, 5 Drawing Sheets

Related U.S. Application Data continuation of application No. 15/978,150, filed on May 13, 2018, now Pat. No. 10,735,446, which is a continuation of application No. 15/363,871, filed on Nov. 29, 2016, now Pat. No. 9,973,523, which is a continuation of application No. 14/457,060, filed on Aug. 11, 2014, now Pat. No. 9,507,768.

(60) Provisional application No. 61/864,274, filed on Aug. 9, 2013.

(51) Int. Cl.
  *G06F 40/30* (2020.01)
  *G06F 40/226* (2020.01)
  *G06F 40/242* (2020.01)
  *G06F 40/289* (2020.01)
  *G06F 40/40* (2020.01)
  *G06F 40/247* (2020.01)
  *G06F 40/253* (2020.01)
  *G06F 40/284* (2020.01)

(52) U.S. Cl.
  CPC ............ *G06F 40/289* (2020.01); *G06F 40/30* (2020.01); *G06N 20/00* (2019.01); *H04L 63/1408* (2013.01); *G06F 40/247* (2020.01); *G06F 40/253* (2020.01); *G06F 40/284* (2020.01); *G06F 40/40* (2020.01)

(56) References Cited

U.S. PATENT DOCUMENTS

| | | | |
|---|---|---|---|
| 5,748,775 A | 5/1998 | Tsuchikawa et al. | |
| 5,751,378 A | 5/1998 | Chen et al. | |
| 5,963,965 A | 10/1999 | Vogel | |
| 5,969,755 A | 10/1999 | Courtney | |
| 6,252,974 B1 | 6/2001 | Martens et al. | |
| 6,263,088 B1 | 7/2001 | Crabtree et al. | |
| 6,570,608 B1 | 5/2003 | Tserng | |
| 6,661,918 B1 | 12/2003 | Gordon et al. | |
| 6,674,877 B1 | 1/2004 | Jojic et al. | |
| 6,678,413 B1 | 1/2004 | Liang et al. | |
| 6,856,249 B2 | 2/2005 | Strubbe et al. | |
| 6,940,998 B2 | 9/2005 | Garoutte | |
| 7,076,102 B2 | 7/2006 | Lin et al. | |
| 7,136,525 B1 | 11/2006 | Toyama et al. | |
| 7,158,680 B2 | 1/2007 | Pace | |
| 7,200,266 B2 | 4/2007 | Ozer et al. | |
| 7,227,893 B1 | 6/2007 | Srinivasa et al. | |
| 7,436,887 B2 | 10/2008 | Yeredor et al. | |
| 7,825,954 B2 | 11/2010 | Zhang et al. | |
| 7,868,912 B2 | 1/2011 | Venetianer et al. | |
| 8,131,012 B2 | 3/2012 | Eaton et al. | |
| 8,176,048 B2 | 5/2012 | Morgan | |
| 8,180,105 B2 | 5/2012 | Cobb et al. | |
| 8,189,905 B2 | 5/2012 | Eaton et al. | |
| 8,270,732 B2 | 9/2012 | Cobb et al. | |
| 8,270,733 B2 | 9/2012 | Cobb et al. | |
| 8,285,060 B2 | 10/2012 | Cobb et al. | |
| 8,306,931 B1 | 11/2012 | Bowman et al. | |
| 8,312,542 B2 | 11/2012 | Eiland et al. | |
| 8,321,958 B1 | 11/2012 | Fleming et al. | |
| 8,340,352 B2 | 12/2012 | Cobb et al. | |
| 8,374,871 B2 | 2/2013 | Ehsani et al. | |
| 8,401,982 B1 | 3/2013 | Satish et al. | |
| 8,411,935 B2 | 4/2013 | Eaton et al. | |
| 8,515,160 B1 | 8/2013 | Khosla et al. | |
| 8,589,315 B2 | 11/2013 | Medasani et al. | |
| 8,639,517 B2* | 1/2014 | Di Fabbrizio | G06F 40/58 704/224 |
| 8,650,026 B2* | 2/2014 | Ehsani | G10L 15/22 704/10 |
| 8,682,812 B1* | 3/2014 | Ranjan | H04L 43/028 706/12 |
| 8,886,579 B2* | 11/2014 | De Sousa Webber | G06F 40/55 706/18 |
| 8,930,959 B2 | 1/2015 | Lahr | |
| 8,948,499 B1* | 2/2015 | Medasani | G06V 20/54 382/156 |
| 8,997,227 B1* | 3/2015 | Mhatre | H04L 63/1416 726/23 |
| 9,064,210 B1* | 6/2015 | Hart | G06F 21/552 |
| 9,094,288 B1* | 7/2015 | Nucci | H04L 43/026 |
| 9,111,148 B2* | 8/2015 | Seow | G06F 18/23 |
| 9,208,675 B2* | 12/2015 | Xu | G06N 20/00 |
| 9,232,140 B2 | 1/2016 | Saitwal et al. | |
| 9,235,812 B2 | 1/2016 | Scholtes | |
| 9,306,962 B1 | 4/2016 | Pinto | |
| 9,317,908 B2* | 4/2016 | Seow | G06T 7/10 |
| 9,329,699 B2* | 5/2016 | Allen | G06F 21/316 |
| 9,436,759 B2* | 9/2016 | Huang | G06F 16/3329 |
| 9,507,768 B2* | 11/2016 | Cobb | H04L 63/1408 |
| 9,633,275 B2* | 4/2017 | Cobb | G06V 10/40 |
| 9,639,521 B2* | 5/2017 | Seow | G06N 3/042 |
| 9,973,523 B2 | 5/2018 | Cobb et al. | |
| 10,187,415 B2 | 1/2019 | Seow et al. | |
| 10,735,446 B2 | 8/2020 | Cobb et al. | |
| 2002/0128821 A1 | 9/2002 | Ehsani et al. | |
| 2003/0107650 A1 | 6/2003 | Colmenarez et al. | |
| 2003/0228058 A1 | 12/2003 | Xie et al. | |
| 2004/0151342 A1 | 8/2004 | Venetianer et al. | |
| 2005/0001759 A1 | 1/2005 | Khosla | |
| 2005/0105765 A1 | 5/2005 | Han et al. | |
| 2005/0240629 A1 | 10/2005 | Gu et al. | |
| 2005/0262343 A1 | 11/2005 | Jorgensen et al. | |
| 2006/0018516 A1 | 1/2006 | Masoud et al. | |
| 2006/0125404 A1 | 6/2006 | Budinger | |
| 2006/0138338 A1 | 6/2006 | Tezuka et al. | |
| 2006/0156404 A1* | 7/2006 | Day | H04L 63/1408 726/23 |
| 2006/0165386 A1 | 7/2006 | Garoutte | |
| 2006/0190419 A1 | 8/2006 | Bunn et al. | |
| 2006/0193516 A1 | 8/2006 | Toyama et al. | |
| 2006/0222206 A1 | 10/2006 | Garoutte | |
| 2007/0136256 A1 | 6/2007 | Kapur et al. | |
| 2007/0250898 A1 | 10/2007 | Scanlon et al. | |
| 2007/0263900 A1 | 11/2007 | Medasani et al. | |
| 2007/0282824 A1 | 12/2007 | Ellingsworth | |
| 2008/0002856 A1 | 1/2008 | Ma et al. | |
| 2008/0120720 A1 | 5/2008 | Guo et al. | |
| 2008/0181453 A1 | 7/2008 | Xu et al. | |
| 2008/0181499 A1 | 7/2008 | Yang et al. | |
| 2008/0193010 A1 | 8/2008 | Eaton et al. | |
| 2008/0240496 A1 | 10/2008 | Senior | |
| 2008/0247599 A1 | 10/2008 | Porikli et al. | |
| 2008/0252723 A1 | 10/2008 | Park | |
| 2008/0262985 A1* | 10/2008 | Cretu | G06N 20/00 706/59 |
| 2009/0016599 A1 | 1/2009 | Eaton et al. | |
| 2009/0016600 A1 | 1/2009 | Eaton et al. | |
| 2009/0022364 A1 | 1/2009 | Swaminathan et al. | |
| 2009/0067716 A1 | 3/2009 | Brown et al. | |
| 2009/0087085 A1 | 4/2009 | Eaton et al. | |
| 2009/0087086 A1 | 4/2009 | Eaton et al. | |
| 2009/0087096 A1 | 4/2009 | Eaton et al. | |
| 2009/0165137 A1 | 6/2009 | Yoo et al. | |
| 2009/0210367 A1 | 8/2009 | Armstrong et al. | |
| 2009/0297023 A1 | 12/2009 | Lipton et al. | |
| 2009/0324107 A1 | 12/2009 | Walch | |

(56) References Cited

U.S. PATENT DOCUMENTS

| | | | |
|---|---|---|---|
| 2010/0063949 | A1 | 3/2010 | Eaton et al. |
| 2010/0150471 | A1 | 6/2010 | Cobb et al. |
| 2010/0322516 | A1 | 12/2010 | Xu et al. |
| 2011/0022562 | A1 | 1/2011 | Gopisetty et al. |
| 2011/0044499 | A1 | 2/2011 | Cobb et al. |
| 2011/0051992 | A1 | 3/2011 | Cobb et al. |
| 2011/0052000 | A1 | 3/2011 | Cobb et al. |
| 2011/0052067 | A1 | 3/2011 | Cobb et al. |
| 2011/0052068 | A1 | 3/2011 | Cobb et al. |
| 2011/0064267 | A1* | 3/2011 | Cobb ............... G06V 20/52 382/103 |
| 2011/0064268 | A1 | 3/2011 | Cobb et al. |
| 2011/0305399 | A1 | 12/2011 | Zitnick et al. |
| 2012/0098750 | A1 | 4/2012 | Allen et al. |
| 2012/0131674 | A1 | 5/2012 | Wittenschlaeger |
| 2012/0173702 | A1 | 7/2012 | Szabo et al. |
| 2012/0262461 | A1 | 10/2012 | Fisher et al. |
| 2012/0265736 | A1 | 10/2012 | Williams et al. |
| 2012/0284793 | A1 | 11/2012 | Steinbrecher et al. |
| 2012/0310944 | A1 | 12/2012 | Mizuguchi et al. |
| 2013/0022242 | A1 | 1/2013 | Cobb et al. |
| 2013/0138428 | A1 | 5/2013 | Chandramouli et al. |
| 2013/0173255 | A1 | 7/2013 | Ehsani et al. |
| 2013/0241730 | A1 | 9/2013 | Saitwal et al. |
| 2013/0242093 | A1 | 9/2013 | Cobb et al. |
| 2013/0243252 | A1 | 9/2013 | Xu et al. |
| 2013/0325442 | A1 | 12/2013 | Dahlmeier et al. |
| 2014/0002647 | A1 | 1/2014 | Xu et al. |
| 2014/0003710 | A1 | 1/2014 | Seow et al. |
| 2014/0003713 | A1 | 1/2014 | Seow et al. |
| 2014/0040279 | A1 | 2/2014 | Beygelzimer et al. |
| 2014/0072206 | A1* | 3/2014 | Eaton ............... G06N 3/006 382/159 |
| 2014/0132786 | A1 | 5/2014 | Saitwal et al. |
| 2014/0156567 | A1 | 6/2014 | Scholtes |
| 2014/0163963 | A2 | 6/2014 | Dahlmeier et al. |
| 2014/0201838 | A1* | 7/2014 | Varsanyi ............ H04L 63/1425 726/23 |
| 2014/0230062 | A1 | 8/2014 | Kumaran |
| 2014/0279762 | A1 | 9/2014 | Xaypanya et al. |
| 2014/0279764 | A1 | 9/2014 | Lahr |
| 2014/0283067 | A1 | 9/2014 | Call et al. |
| 2015/0003671 | A1 | 1/2015 | Saitwal et al. |
| 2015/0019463 | A1 | 1/2015 | Simard et al. |
| 2015/0046155 | A1 | 2/2015 | Seow et al. |
| 2015/0047040 | A1 | 2/2015 | Cobb et al. |
| 2015/0117765 | A1 | 4/2015 | Lahr |
| 2015/0134336 | A1 | 5/2015 | Huang et al. |
| 2015/0229661 | A1 | 8/2015 | Balabine et al. |
| 2016/0117589 | A1 | 4/2016 | Scholtes |
| 2016/0134812 | A1 | 5/2016 | Saitwal et al. |
| 2016/0232652 | A1 | 8/2016 | Seow et al. |
| 2017/0163672 | A1 | 6/2017 | Cobb et al. |
| 2018/0046613 | A1 | 2/2018 | Seow et al. |
| 2019/0124101 | A1 | 4/2019 | Cobb et al. |
| 2019/0230108 | A1 | 7/2019 | Seow et al. |
| 2021/0014258 | A1 | 1/2021 | Cobb et al. |
| 2022/0006825 | A1 | 1/2022 | Seow |

FOREIGN PATENT DOCUMENTS

| | | |
|---|---|---|
| CN | 102571486 A | 7/2012 |
| WO | WO-2009049314 A2 | 4/2009 |
| WO | WO-2015021484 A1 | 2/2015 |
| WO | WO-2015021485 A1 | 2/2015 |

OTHER PUBLICATIONS

Bobbio, A. et al., "Analysis of Large Scale Interacting Systems by Mean Field Method," In: Fifth International Conference on Quantitative Evaluation of Systems 2008, pp. 215-224, Sep. 14-17, 2008.

Connell, J. et al., "Detection and Tracking in the IBM People Vision System," IEEE ICME, Jun. 2004, pp. 1-4.

Elgammal et al. "Non-parametric Model for Background Subtraction," Computer Vision Laboratory, University of Maryland; Jun. 2000; 17 pages, College Park, MD.

Extended European Search Report for European Application No. 14833998.9, dated Aug. 8, 2016, 8 pages.

Extended European Search Report for European Application No. 14835377.4, dated Jul. 25, 2016, 9 pages.

Fernandez, C. et al., "Determining the Best Suited Semantic Events for Cognitive Surveillance," Expert Systems with Applications, 38(4):4068-4079 (Apr. 2011).

Grabner, H. et al., "On-line Boosting and Vision," IEEE Conference on Computer Vision and Pattern Recognition (CVPR), 2006, vol. 1, pp. 260-267.

Haritaoglu et al., "W4: Real-Time Surveillance of People and Their Activities," IEEE Transactions on Pattern Analysis and Machine Intelligence, Aug. 2000, vol. 22, No. 8, pp. 809-830.

Haritaoglu, I. et al., "Ghost: A Human Body Part Labeling System Using Silhouettes," 14th Annual International Conference on Pattern Recognition, Aug. 16-20, 1998, Brisbane, Australia, pp. 77-82.

Hubballi, N. et al., "Layered Higher Order N-grams for Hardening Payload Based Anomaly Intrusion Detection," ARES 2010 International Conference on Availability, Reliability and Security, Piscataway, New Jersey, Feb. 15, 2010, pp. 321-326.

International Search Report and Written Opinion for International Application No. PCT/US2014/050604, dated Nov. 13, 2014, 8 pages.

International Search Report and Written Opinion for International Application No. PCT/US2014/050606, dated Dec. 26, 2014, 11 pages.

Ivanov et al., "Video Surveillance of Interactions," MIT Media Laboratory, Cambridge, MA, Jul. 1999, 8 pages, Fort Collins, Colorado, US.

Kanerva, P., Chapter 3: "Sparse Distributed Memory and Related Models," In M. H. Hassoun, ed., Associative Neural Memories: Theory and Implementation, 1993, pp. 50-76, New York: Oxford University Press.

Nock, R. et al., "Statistical Region Merging," IEEE Transactions on Pattern Analysis and Machine Intelligence, Nov. 2004, vol. 26(11):1452-1458.

Office Action for U.S. Appl. No. 15/469,568, dated Jan. 25, 2018, 7 pages.

Ramadge, P. J. G. et al., "The Control of Discrete Even Systems," Proceeding of the IEEE, vol. 77, No. 1, pp. 81-98, Jan. 1989.

Rieck, K. et al., "Language models for detection of unknown attacks in network traffic," Journal in Computer Virology, 2(4):243-256 (Feb. 2007); Published online: Dec. 19, 2006.

Senior, A. et al., "Appearance Models for Occlusion Handling," IBM T. J. Watson Research Center, 2001, 8 pages, Yorktown, Heights, NY US.

Stauffer, C. et al., "Adaptive background mixture models for real-time tracking," Proceedings IEEE Conference on Computer Vision and Pattern Recognition, 1999: pp. 246-252.

Stauffer, C. et al., "Learning Patterns of Activity Using Real-Time Tracking," IEEE Transactions on Pattern Analysis and Machine Intelligence (TPAMI), Aug. 2000, vol. 22(8):747-757.

Werner-Stark, A. et al., "Discrete Event Model Structure Identification Using Process Mining," Proceedings of the IASTED International Conference Modelling, Identification, and Control (MIC 2011), Feb. 14-16, 2011, Innsbruck, Austria, pp. 228-233.

Wu, L., "Visual language analyses: From underlayer visual characteristic expressions to semantic distance learning," China Doctor's Degree Theses Full Text Database Information Science and Technology Collection, pp. I138-I151, Oct. 15, 2010.

International Preliminary Report on Patentability for International Application No. PCT/US2014/050604, dated Feb. 18, 2016, 7 pages.

International Preliminary Report on Patentability for International Application No. PCT/US2014/050606, dated Feb. 18, 2016, 9 pages.

\* cited by examiner

COGNITIVE INFORMATION SECURITY USING A BEHAVIOR RECOGNITION SYSTEM

CROSS-REFERENCE TO RELATED APPLICATIONS

This application is a continuation of U.S. patent application Ser. No. 16/945,087, filed on Jul. 31, 2020, which in turn is a continuation of U.S. patent application Ser. No. 15/978,150, filed on May 13, 2018 and issued as U.S. Pat. No. 10,735,446 on Aug. 4, 2020, which in turn is a continuation of U.S. patent application Ser. No. 15/363,871, filed on Nov. 29, 2016 and issued as U.S. Pat. No. 9,973,523 on May 15, 2018, which in turn is a continuation of U.S. patent application Ser. No. 14/457,060, filed on Aug. 11, 2014 and issued as U.S. Pat. No. 9,507,768 on Nov. 29, 2016, which in turn claims priority to and benefit of U.S. Provisional Application No. 61/864,274, filed Aug. 9, 2013; the entireties of each of the aforementioned applications are herein expressly incorporated by reference in their entireties for all purposes.

FIELD

Embodiments presented herein provide techniques for analyzing streams of computer data. More specifically, techniques are disclosed for analyzing and learning patterns of behavior from monitoring computer networks.

BACKGROUND

Intrusion detection systems (IDS) monitor network or system activities for malicious activities or violations and produce reports to a management console. Many current intrusion detection systems are signature-based.

SUMMARY

One embodiment presented herein includes a method for processing streams of data of one or more networked computer systems. The method generally includes receiving an ordered stream of normalized vectors corresponding to information security data obtained from one or more sensors monitoring a computer network. A neuro-linguistic model of the information security data is generated by clustering the ordered stream of vectors and assigning a letter to each cluster, outputting an ordered sequence of letters based on a mapping of the ordered stream of normalized vectors to the clusters, building a dictionary of words from of the ordered output of letters, outputting an ordered stream of words based on the ordered output of letters, and generating a plurality of phrases based on the ordered output of words.

Another embodiment includes a computer-readable storage medium having instructions, which, when executed on a processor, performs an operation for processing streams of data of one or more networked computer systems. The operation generally includes receiving an ordered stream of normalized vectors corresponding to information security data obtained from one or more sensors monitoring a computer network. A neuro-linguistic model of the information security data is generated by clustering the ordered stream of vectors and assigning a letter to each cluster, outputting an ordered sequence of letters based on a mapping of the ordered stream of normalized vectors to the clusters, building a dictionary of words from of the ordered output of letters, outputting an ordered stream of words based on the ordered output of letters, and generating a plurality of phrases based on the ordered output of words.

Still another embodiment includes a system having a processor and a memory storing a program, which, when executed on the processor, performs an operation for processing streams of data of one or more networked computer systems. The operation generally includes receiving an ordered stream of normalized vectors corresponding to information security data obtained from one or more sensors monitoring a computer network. A neuro-linguistic model of the information security data is generated by clustering the ordered stream of vectors and assigning a letter to each cluster, outputting an ordered sequence of letters based on a mapping of the ordered stream of normalized vectors to the clusters, building a dictionary of words from of the ordered output of letters, outputting an ordered stream of words based on the ordered output of letters, and generating a plurality of phrases based on the ordered output of words.

Yet another embodiment includes a method for processing streams of data of one or more networked computer systems. The method generally includes receiving a stream of normalized vectors corresponding to information security data monitored over a computer network. A plurality of symbols from the stream of normalized vectors is generated. A dictionary of words from combinations of the generated plurality of symbols is generated based on an order by which symbols appear in the stream relative to one another. A plurality of phrases is generated based on relationships identified between words in the dictionary. Each relationship is based on an order by which each word appears relative to one another. Patterns of behavior are identified within the information security data.

BRIEF DESCRIPTION OF THE DRAWINGS

So that the manner in which the above recited features, advantages, and objects of the present disclosure are attained and can be understood in detail, a more particular description of the disclosure, briefly summarized above, may be had by reference to embodiments illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
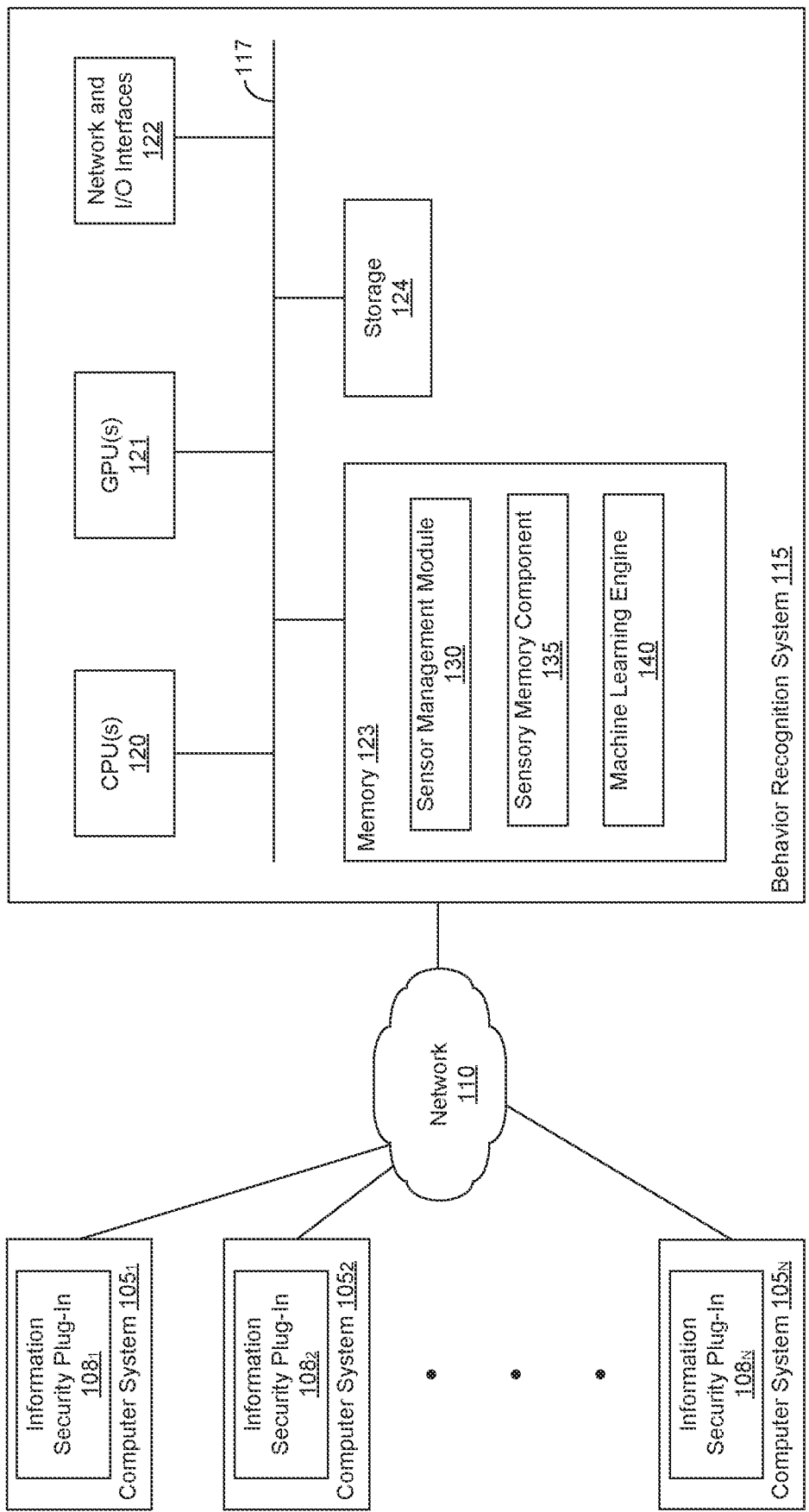
FIG. 1 illustrates an example computing environment, according to one embodiment.

A computer network may include an intrusion detection system (IDS) that monitors network or system activity for malicious activities or violations within the network and produces reports to a management console. Many current intrusion detection systems are signature-based. That is, an IDS may be configured with signatures to detect malicious or unwanted activity. As known, an attack signature is a sequence of computer activities (or alterations of those activities) corresponding to a known attack, such as towards a vulnerability in an operating system or application. An attack signature may also be a bit pattern in a network packet corresponding to a known vulnerability. An IDS may use attack signatures through passive protocol analysis (e.g., using a "sniffer" in promiscuous mode) or signature analysis (e.g., interpreting a specific series of packets or data within that packet to a known pattern of attack). For example, an IDS may be configured with an attack signature that detects a particular virus in an email. The signature may contain information about subject field text associated with previous e-mails that have contained the virus or attachment filenames in the past. With the signature, the IDS can compare the subject of each e-mail with subjects contained in the signature and also attachments with known suspicious filenames.

However, the signature-based approach raises several concerns. For instance, although an IDS may possibly detect alterations to a particular attack, the alterations typically must be defined in the signature to do so. Similarly, because attack signatures are predefined, the IDS is susceptible to new attacks that have not yet been observed. That is, someone generally has to observe a particular attack pattern or instance of an exploit before defining a signature. As a result, an IDS may be unable to detect so-called "zero-day" attacks (i.e., attacks that exploit a previously unknown vulnerability in a system or application). As the number of systems is increasingly being breached by zero-day attacks, the signature-based approach in intrusion detection systems becomes of limited usefulness. In addition, attackers may use code morphing techniques to subvert attack signatures, making the attacks difficult to detect.

Embodiments presented herein provide a method and a system for analyzing and learning patterns of behavior based on streams of data collected from various data sources in computer systems. In one embodiment, an information security plug-in installed on computer systems in a network send data from a variety of sources to a behavior recognition system. For example, the plug-in may receive packet traffic, bit streams, and security logs.

In one embodiment, the behavior recognition system receives computer network data streams observed by the information security plug-in. The behavior recognition system analyzes the data streams to identify recurring patterns.

To do so, in one embodiment, the behavior recognition system normalizes the data streams to numerical values (e.g., within a range of 0 to 1) and generates vectors of the normalized data. In one embodiment, the behavior recognition system generates a linguistic model from the normalized vectors. Specifically, a neuro-linguistic module in the behavior recognition system clusters the normalized vectors and assigns a distinct symbol for each cluster. The symbols act as a building block for the linguistic model. The neuro-linguistic module identifies combinations of symbols, i.e., words (nouns, adjective, verbs, and the like), based on a frequency of symbols recurring together in the data. That is, the neuro-linguistic module builds a dictionary that includes the words by identifying symbol combinations appearing in the normalized data. Once the dictionary is mature (e.g., after identifying a specified amount of statistically relevant words), the neuro-linguistic module identifies combinations of words from the dictionary, i.e., phrases, based on a frequency of words in the dictionary which occur together in the data. In addition, the neuro-linguistic module may also evaluate unusualness scores that indicate how infrequent a given symbol, word, or phrase appears in the data relative to other symbols, words, and phrases, respectively. The neuro-linguistic module may output the symbols, words, phrases, and unusualness scores to a cognitive module in the behavior recognition system. The unusualness score (for a letter, word, or phrase observed in input data) indicates how infrequently the letter, word, or phrase has occurred relative to past observations. Thus, the behavior recognition system may use the unusualness scores to measure how unusual a current syntax is relative to stable models. That is, the system generates a stable model of symbols (i.e., letters), stable model of words built from the symbols (i.e., a dictionary) and a stable model of phrases built from the words (i.e., a syntax). The behavior recognition system then compares current observations of letters, words, and phrases generated from the same input data stream (e.g., normalized vectors generated from network and security data) against the stable models to measure of how unusual a current observation is relative to the sable models of letters, words, and phrases. Further, the current observations update the stable models, allowing for changes in the input stream, over time, to be reflected in the models generated from the input stream. The cognitive module uses the output generated by the stable models and ongoing observations to learn and recognize behaviors.

In one embodiment, the cognitive module identifies patterns based on the data streams and builds memories to learn the expected patterns, as represented by different combinations of phrases, built from words in the dictionary, which themselves are built from symbols assigned to observations of the observed data. Over time, the symbols, words, and phrases generated from the observed data "mature." Thereafter, upon observing subsequent events in the data streams, the cognitive module is able to detect anomalous activity and generate alerts when anomalous activity is observed.

The behavior recognition system learns normal activity occurring over a computer network based on data provided by the plug-ins installed in networked systems. As a result, the behavior recognition system may detect network activity that is abnormal based on what has been observed as normal activity, without relying on training data to do so. Advantageously, this approach avoids the need for pre-defined attack signatures, or any predefined patterns, to detect suspicious behavior to systems and applications. That is, the behavior recognition system teaches itself an alphabet, a dictionary, and a grammar of phrases. Once taught, the behavior recognition system learns patterns of phrases and alerts when an observed pattern is sufficiently distinct from prior observation.

Note, the following description relies on specific examples of network and information security data provided as input to a behavior recognition system. However, one of skill in the art will recognize that embodiments are applicable in other contexts related to observing incoming network security data and analyzing the observed data to detect anomalous behavior.

FIG. 1 illustrates an example computing environment 100, according to one embodiment. As shown, the computing environment 100 includes one or more computer systems $105_{1-N}$ connected via a network 110. Further, the computing environment includes a behavior recognition system 115. In one embodiment, the computing environment 100 is representative of an enterprise network. A computer system 105 may be a physical computing system (e.g., a desktop computer, a laptop computer, etc.) or may be a virtual computing instance executing within a computing cloud.

In one embodiment, each of the computer systems $105_{1-N}$ includes an information security plug-in $108_{1-N}$. An information security plug-in 108 is configured to receive (or obtain) data from a variety of sources of a computer system 105. Each data source is associated with an identifier. Thus, when an information security plug-in 108 receives data from a particular source, the information security plug-in 108 may receive an identifier, timestamp information, and raw numerical values representing the actual data. Examples of the data sources include packet traffic, datagram traffic, Simple Network Management Protocol (SNMP) trap data, and the like. For instance, the information security plug-in 108 may receive information raw numerical data associated with incoming and outgoing packet traffic, such as source addresses, destination addresses, etc. Other examples may include information related to disk mounts and physical accesses. For instance, if an individual inserts a flash drive into a USB port of a computer system 105 or mounts an external hard disk drive to the system, the information security plug-in 108 may receive a stream of data corresponding to the event (e.g., as raw numbers and identifiers associated with the flash drive, USB port, etc.).

In one embodiment, the information security plug-in 108 sends raw data to a driver in the behavior recognition system 115 that normalizes the data. The driver also evaluates statistics associated with each data value, such as a recent average and historical high and low values. Normalizing the data input by the information security plug-in 108 provides a standard format that allows the behavior recognition system 115 to analyze the data and learn patterns of behavior by observing the data streams of multiple information security plug-ins monitoring the computer network.

Illustratively, the behavior recognition system 115 includes one or more central processing units (CPUs) 120, one or more graphics processing units (GPUs) 121, network and I/O interfaces 122, a storage 124 (e.g., a disk drive, optical disk drive, and the like), and a memory 125 that includes a sensor management module 130, a sensory memory component 135, and a machine learning engine 140. In one embodiment, the behavior recognition system 115 may include one or more physical computing systems connected via a network (e.g., a local area network, the Internet, etc.). In another embodiment, the behavior recognition system 115 may be cloud-computing resources connected over the network.

The CPU 120 retrieves and executes programming instructions stored in the memory 125 as well as stores and retrieves application data residing in the storage 124. In one embodiment, the GPU 121 implements a Compute Unified Device Architecture (CUDA) developed by NVIDIA. Further, the GPU 121 provides general purpose processing using the parallel throughput architecture of the GPU 121 to more efficiently retrieve and execute programming instructions stored in the memory 125 and also to store and retrieve application data in the storage 124. Taking advantage of the parallel computing elements of the GPU 121 allows the behavior recognition system 115 to process incoming data from multiple sources (e.g., the computer systems $105_{1-N}$). As a result, the behavior recognition system 115 may scale to evaluate a large number of information streams.

The sensor management module 130 provides an information security driver that receives data from each information security plug-in 108. The information security driver may receive the data at specified intervals (e.g., once a minute, once every thirty minutes, once every thirty seconds, etc.). As stated, the information security driver normalizes the data sent by each of the information security plug-ins 108. In one embodiment, the sensor management module 130 may enable or disable data sources to be monitored by information security plug-ins 108 (e.g., in response to a request sent by a management console of the behavior recognition system 115). For example, if the management console requests the behavior recognition system 115 to monitor outgoing traffic from a particular computer system in the network, the sensor management module 130 determines the information security plug-in 108 associated with the computer system and enables outgoing traffic monitoring for that plug-in.

The sensory memory component 135 is a data store that transfers large volumes of data from the sensor management module 130 to the machine learning engine 140. The sensory memory component 135 stores the data as records. Each record may include an identifier, a timestamp, and a data payload. Further, the sensory memory component 135 aggregates incoming data in a time-sorted fashion. Storing incoming data from each of the information security plug-ins 108 in a single location where the data may be aggregated allows the machine learning engine 140 to process the data efficiently. Further, the behavior recognition system 115 may reference data stored in the sensory memory component 135 in generating alerts for anomalous activity. In one embodiment, the sensory memory component 135 may be implemented in via a virtual memory file system in the memory 123. In another embodiment, the sensory memory component 135 is implemented using a key-value share.

The machine learning engine 140 receives data output from the sensor management module 135. Generally, components of the machine learning engine 140 generate a linguistic representation of the normalized vectors. As described further below, to do so, the machine learning engine 140 clusters normalized values having similar features and assigns a distinct symbol to each cluster, The machine learning engine 140 may then identify recurring combinations of symbols (i.e., words) in the data. The machine learning engine 140 then similarly identifies recurring combinations of words (i.e., phrases) in the data.

The resulting linguistic model provides grammatical statements that the machine learning engine 140 uses to describe events occurring in the data. The machine learning engine 140 analyzes the linguistic model to learn patterns of behavior. The machine learning engine 140 may store memories of learned patterns and determine statistical frequencies of patterns recurring in incoming data. Thus, over time, the machine learning engine 140 learns patterns used to determine whether a current observation is a normal or abnormal event. That is, rather than rely on pre-defined attack signatures and activities defined in advance, the machine learning engine 140 maintains memories of what has been observed in the linguistic representation of the data to determine expected behavior. Thereafter, the machine learning engine 140 may decide whether the behavior of an observed event is anomalous based on prior learning.

Data describing whether a normal or abnormal event has occurred or what the event is can be provided to an output device to issue alerts. Such an output device may present an alert message on a graphical user interface screen on a management console.

Figure 2:
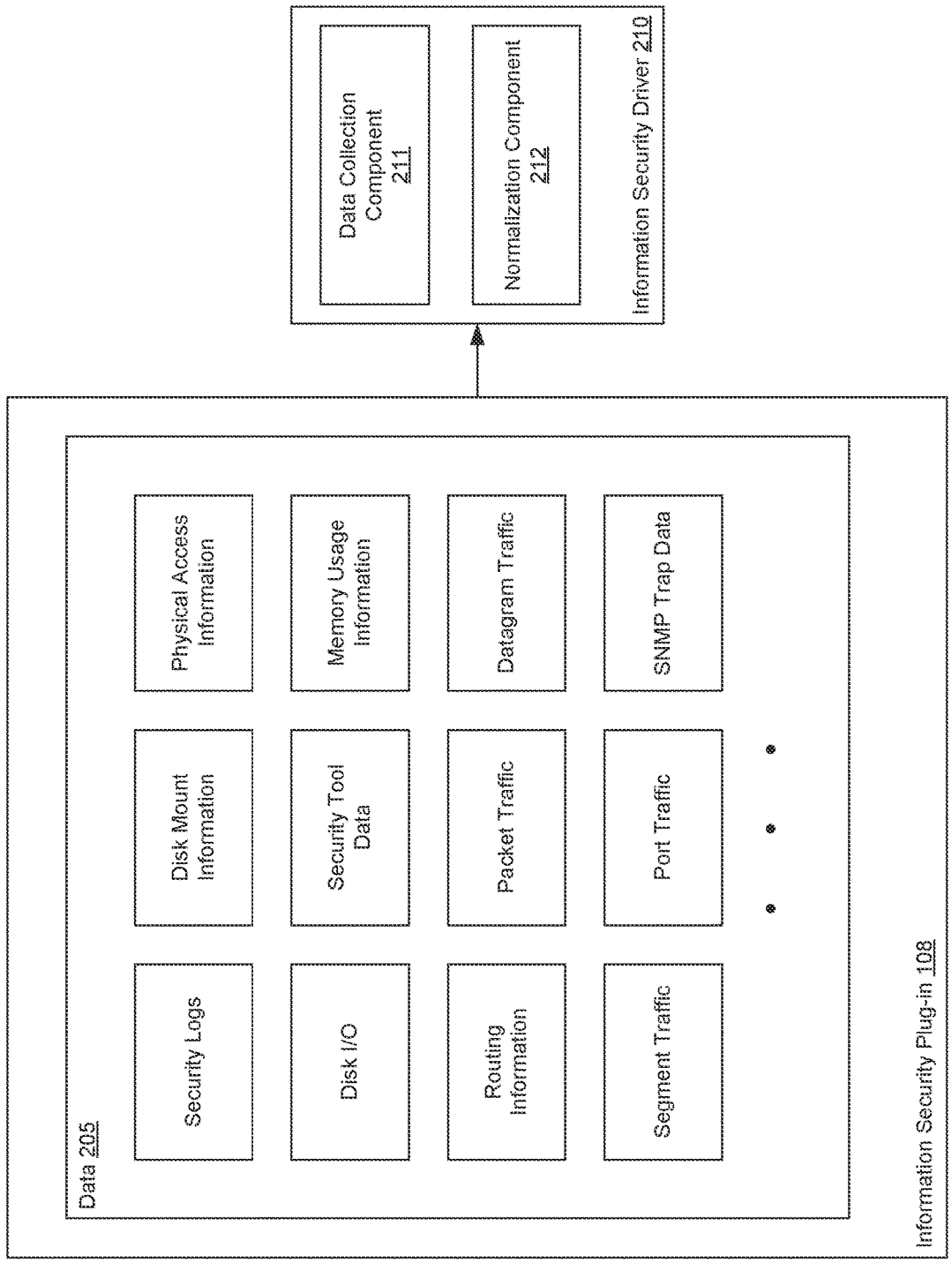
FIG. 2 further illustrates the information security plug-in described in FIG. 1, according to one embodiment.

FIG. 2 further illustrates the information security plug-in 108, according to one embodiment.

As shown, examples of such data 205 may include security logs, disk mount information, physical access information, disk I/O logs, IP address logs, security tool data (e.g., WireShark alerts, packet sniffer alerts, etc.), memory usage information, routing information, packet traffic, datagram traffic, segment traffic, port traffic, and SNMP trap data. Of course, the data 205 are merely examples of data the information security plug-in 108 may send to the machine learning engine 140. Further, the information security plug-in 108 may include multiple sensor modules corresponding to each type of data 205 to receive. For example, one such sensor module may receive octets of IP address information of incoming and outgoing network data. Another sensor module may receive data related to an external hard drive being mounted to a given computer system. The data may include port information, disk size, file system information, etc.

In one embodiment, the information security plug-in 108 sends the data 205 to an information security driver 210 within the sensor management module 130 hosted on the behavior recognition system 115. The information security driver 210 may include a data collection component 211 and a normalization component 212. The data collection component 211 receives data 205 from the information security plug-in 108. The information security plug-in 108 may send the data to the data collection component 211 at an episodic rate, e.g., once every five seconds, once every ten seconds, etc. In one embodiment, the normalization component 212 converts raw data sent by an information security plug-in 108, e.g., to a numerical value ranging from 0 to 1. In addition, the normalization component 212 evaluates additional statistics to associate with each value, such as a recent average and historical high and low values. The information security driver 210 may use such values to readjust normalization techniques in the event the information security driver 210 is modified. Further, normalizing the information security data provides the behavior recognition system 115 with a standard format for analyzing information corresponding to data source 205. For example, assume the information security plug-in 108 sends data corresponding to an IP address to the data collection component 211. The normalization component 212 converts each octet of the IP address to a numerical value between 0 and 1. The behavior recognition system 115 may determine, from the normalized data, IP address locations that are regularly (or not regularly) accessed by a computer system in the network. Similarly, if the information security plug-in 108 sends data from security logs to the information security driver 210, the normalization component 212 converts the data to normalized values between 0 and 1. Thus, regardless of the information security plug-ins 108 used to monitor network communications or computer security data, or the form or presentation of that information, the data itself is standardized to a common format, e.g., a vector with a number of fields including a name, a timestamp, an observation ID, and a collection of floating point values, one for each normalized observation.

Figure 3:
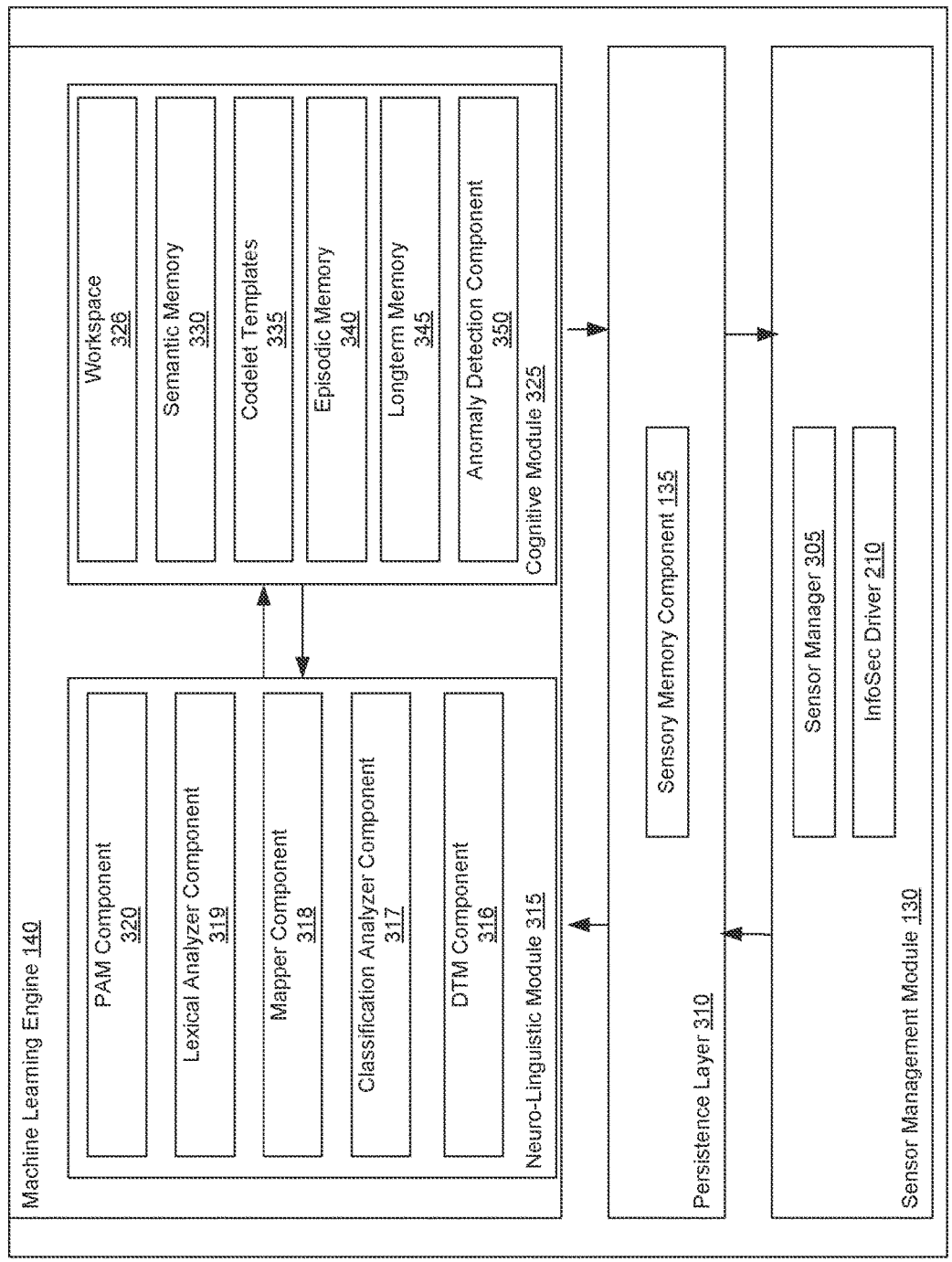
FIG. 3 illustrates a system architecture of the behavior recognition system described in FIG. 1, according to one embodiment.

FIG. 3 illustrates a system architecture of the behavior recognition system 115, according to one embodiment. As shown, the sensor management module 130 and the machine learning engine 140 communicate via a persistence layer 310.

The persistence layer 310 includes multiple data stores that maintain information used by components of the behavior recognition system 115. For example, the persistence layer 310 includes data stores that maintain information describing properties of the information security plug-ins $108_{1-N}$ sending data to the behavior recognition system 115, system properties (e.g., serial numbers, available memory, available capacity, etc. of the behavior recognition system 115), and properties of the information security driver 210 (e.g., active plug-ins 118, active sensors associated with each plug-in 118, normalization settings, etc.). Other data stores may maintain learning model information, system events, and behavioral alerts. In addition, the sensory memory component 135 resides in the persistence layer 310.

The machine learning engine 140 itself includes a neuro-linguistic module 315 and a cognitive module 325. The neuro-linguistic module 315 performs neural network-based linguistic analysis of normalized input data to describe activity observed in the data. However, rather than describing the activity based on pre-defined objects and actions, the neuro-linguistic module 315 develops a custom language based on symbols, e.g., letters, generated from the input data. As shown, the neuro-linguistic module 315 includes a data transactional memory (DTM) component 316, a classification analyzer component 317, a mapper component 318, a lexical analyzer component 319, and a perceptual associative memory (PAM) component 320.

In one embodiment, the DTM component 316 retrieves the normalized vectors of the network security streams from the sensory memory component 135 and stages the network security data streams in the pipeline architecture provided by the GPU 121.

The classification analyzer component 317 evaluates the normalized network security streams organized by the DTM component 505 and maps the data on a neural network. In one embodiment, the neural network is a combination of a self-organizing map (SOM) and an adaptive resonance theory (ART) network. The neural network clusters the network security streams based on values occurring repeatedly in association with each other.

The mapper component 318 identifies symbols (i.e., builds an alphabet of letters) based on the clustered network security streams. Specifically, the mapper component 318 determines a statistical distribution of the clustered data and assigns a symbol to data belonging to a same cluster. In one embodiment, a symbol provides a "fuzzy" (in the artificial intelligence sense of the word) representation of the data belonging to a given cluster. The symbol may be described as a letter of an alphabet.

Further, the mapper component 318 is adaptive. That is, the mapper component 318 may identify new symbols corresponding to new clusters generated from the normalized data, as such clusters are reinforced to be statistically relevant. The mapper component 318 learns on-line and may merge similar observations to a more generalized symbol. Specifically, when the mapper component 318 generates a cluster, the mapper component 318 assigns a symbol to that cluster. Thereafter, as additional observations map to that cluster are observed, the corresponding cluster may "mature," i.e., reach a level of statistical significance. Once a given cluster matures, the mapper component 318 begins sending that symbol to the lexical analyzer component 319 in response to normalized data that matches the cluster. In one embodiment, the mapping component 318 limits the set of symbols that can be sent to the lexical component 319 to the most statistically relevant clusters. In practice, outputting symbols (i.e., letters) assigned to the top thirty-two clusters has shown to be effective. However, other amounts may also prove effective, such as the top sixty-four or 128 most frequently recurring symbols. Note, over time, the most frequently observed symbols may change as different clusters increase in statistical significance.

In one embodiment, the mapper component 318 may decay symbols over time for particular data that the mapper component 318 no longer observes in the normalized vectors.

In one embodiment, the mapper component 318 evaluates an unusualness score for each symbol. The unusualness score is based on the frequency of a given symbol relative to other symbols observed. The unusualness score may increase or decrease over time as the neuro-linguistic module 315 receives additional data.

The mapper component 318 sends a stream of the symbols (e.g., letters), timestamp data, unusualness scores, and statistical data (e.g., a representation of the cluster associated with a given symbol) to the lexical analyzer component 319. The lexical analyzer component 319 builds a dictionary based on symbols output from the mapper component 318. In practice, the mapper component 318 may need approximately 5000 observations (i.e., normalized vectors of input data) to generate a stable alphabet of symbols.

The lexical analyzer component 319 builds a dictionary that includes combinations of symbols, e.g., words, from the symbols transmitted by the mapper component 318. The lexical analyzer component 319 identifies repeating patterns and sub-patterns of letters occurring in the letters output from the mapper component 318 and calculates frequencies of the patterns occurring throughout the symbol stream. The combinations of symbols may represent a particular activity, event, etc.

In one embodiment, the lexical analyzer component 319 limits the length of words in the dictionary to allow the lexical analyzer component 319 to identify a number of possible combinations without adversely affecting the performance of the behavior recognition system 115. Further, the lexical analyzer component 319 uses a sliding window based on the maximum length to identify words for the dictionary. For example, assume the maximum length of a word may be five symbols. In this case, the lexical analyzer component 319 may use a sliding window of ten symbols to identify words (and sub-words within the words) within the window. In practice, limiting a word to a maximum of five or six symbols has shown to be effective.

Like the mapper component 318, the lexical analyzer component 319 is adaptive. That is, the lexical analyzer component 319 may learn, decay, and generate words in the dictionary over time. Further, the lexical analyzer component 319 may determine an unusualness score for each word based on how frequently the word recurs in the data. The unusualness score may increase or decrease over time as the neuro-linguistic module 315 processes additional data.

In addition, as additional observations (i.e., symbols) are passed to the lexical analyzer component 319 and identified as a given word, the lexical analyzer component 319 may determine that the word has matured. Once a word has matured, the lexical analyzer component 319 may output observations of that word to the PAM component 320. In one embodiment, the lexical analyzer component 319 limits words sent to the PAM component 320 to the most statistically relevant words. In practice, outputting occurrences of the top 1000 most frequently occurring words has shown to be effective. Note, over time, the most frequently observed words may change as the observations of incoming letters change in frequency (or as new letters emerge by the clustering of input data by the mapper component 318.

Once the lexical analyzer component 319 has built the dictionary (i.e., identifies words that have a dynamically determined statistical relevance), the lexical analyzer component 319 sends data that includes a stream of the symbols, words, timestamp data, unusualness scores, and statistical calculations to the PAM component 320. The PAM component 320 builds a syntax of phrases with from the words output by the lexical analyzer component 319. In practice, lexical analyzer component 319 may build a useful dictionary of words after receiving approximately 15,000 observations (i.e., input letters from the mapper component 318).

The PAM component 320 identifies a syntax of phrases based on the sequence of words output from the lexical analyzer component 319. Specifically, the PAM component 320 receives the words identified by the lexical analyzer component 319 generates a connected graph, where the nodes of the graph represent the words, and the edges represent a relationship between the words. The PAM component 320 may reinforce or decay the links based on the frequency that the words are connected with one another in a data stream.

Similar to the mapper component 318 and the lexical analyzer component 319, the PAM component 320 determines an unusualness score for each identified phrase based on how frequently the phrase recurs in the linguistic data. The unusualness score may increase or decrease over time as the neuro-linguistic module 315 processes additional data.

Similar to the lexical analyzer component 319, the PAM component 320 may limit the length of a given phrase to allow the PAM component 320 to be able to identify a number of possible combinations without adversely affecting the performance of the behavior recognition system 115. Further, PAM component 320 uses a sliding window based on the maximum length to identify phrases. For example, assume the maximum length of a word may be eight. In this case, the lexical analyzer component 319 may use a sliding window of sixteen symbols to identify phrases (and sub-phrases) within the window.

The PAM component 320 identifies syntax phrases over observations of words output from the lexical analyzer component 319. As observations of words accumulate, the PAM component 320 may determine that a given phrase has matured, i.e., a phrase has reached a measure of statistical relevance. The PAM component 320 then outputs observations of the that phrase to the cognitive module 325. The PAM component 320 sends data that includes a stream of the symbols, words, phrases, timestamp data, unusualness scores, and statistical calculations to the semantic memory 330 of the cognitive module 325. In practice, the PAM component 320 may obtain a meaningful set of phrases after observing about 5000 words from the lexical analyzer component 319. The semantic memory 330 may identify complex passages of multiple phrases from the phrases output by the PAM component 320.

After maturing, the generated letters, words, and phrases form a stable neuro-linguistic model of the information security data that the behavior recognition system 115 uses to compare subsequent observations of letters, words, and phrases against the stable model. The neuro-linguistic module 315 updates the linguistic model as new data is received. Further, the neuro-linguistic module 315 may compare a currently observed syntax to the model. That is, after building a stable set of letters, the neuro-linguistic module 315 may build a stable model of words (e.g., a dictionary). In turn, the neuro-linguistic module 315 may be used to build a stable model of phrases (e.g., a syntax). Thereafter, when the neuro-linguistic module 315 receives subsequent normalized information security data, the module 315 can output an ordered stream of symbols, words, and phrases, all of which can be compared to the stable model to identify interesting patterns or detect deviations occurring in the stream of input data.

As shown, the cognitive module 325 includes a workspace 326, a semantic memory 330, codelet templates 335, episodic memory 340, long term memory 345, and an anomaly detection component 350.

In one embodiment, the workspace 326 provides a computational engine for the machine learning engine 140. For example, the workspace 326 may retrieve linguistic data having statistical relevance (e.g., phrases that occur frequently in the data) from the episodic memory 340 and the longterm memory 345, select codelet templates 335 to execute, etc. Further, the workspace 326 receives the symbols, words, and phrases (as well as unusualness scores) from the neuro-linguistic module 315 and stores these data in the semantic memory 330.

The workspace 326 retrieves the neurolinguistic data from semantic memory 710 and disseminates this data to different portions of the cognitive module 210 as needed The episodic memory 340 stores linguistic observations related to a particular episode in the immediate past and may encode specific details, such as the "what" and the "when" of a particular event.

The long-term memory 345 stores generalizations of the linguistic data with particular episodic details stripped away. In this way, when a new observation occurs, memories from the episodic memory 340 and the long-term memory 345 may be used to relate and understand a current event, i.e., the new event may be compared with past experience (as represented by previously observed linguistic data), leading to both reinforcement, decay, and adjustments to the information stored in the long-term memory 345, over time. In a particular embodiment, the long-term memory 345 may be implemented as an ART network and a sparse-distributed memory data structure. Importantly, however, this approach does not require events to be defined in advance.

The codelet templates 335 provide a collection of executable codelets, or small pieces of code that evaluate different sequences of events to determine how one sequence may follow (or otherwise relate to) another sequence. More generally, a codelet may detect interesting patterns from the linguistic representation of information security data. For instance, a codelet may compare a current observation (i.e., a current phrase instance with what has been observed in the past) with previously observed activity stored in the semantic memory 330. By repeatedly scheduling codelets for execution, copying memories and percepts to/from the workspace 326, the cognitive module 325 performs a cognitive cycle used to observe, and learn, about patterns of behavior that occur within the linguistic data.

The anomaly detection component 350 evaluates unusualness scores sent by the neuro-linguistic module 315 to determine whether to issue an alert in response to some abnormal activity indicated by the unusualness scores. Specifically, the anomaly detection component 350 is provides probabilistic histogram models (e.g., an unusual lexicon model, an unusual syntax model, and an unusual model) which represent the unusualness scores. The anomaly detection component 350 may send alert data to an output device, where an administrator may view the alert, e.g., via a management console.

The cognitive module 325 performs learning analysis on the linguistic content delivered to semantic memory 330 (i.e., the identified symbols, words, phrases) by comparing new observations to the learned patterns kept in semantic memory 330 and then estimating the rareness of these new observations.

Specifically, the anomaly component 725 evaluates the unusualness scores of each of the symbols, words, and phrases to identify abnormal occurrences in the observed data. Once an anomalous observation has been identified, the anomaly component may issue an alert (e.g., notify an administrator or user of the behavior recognition system 115).

Figure 4:
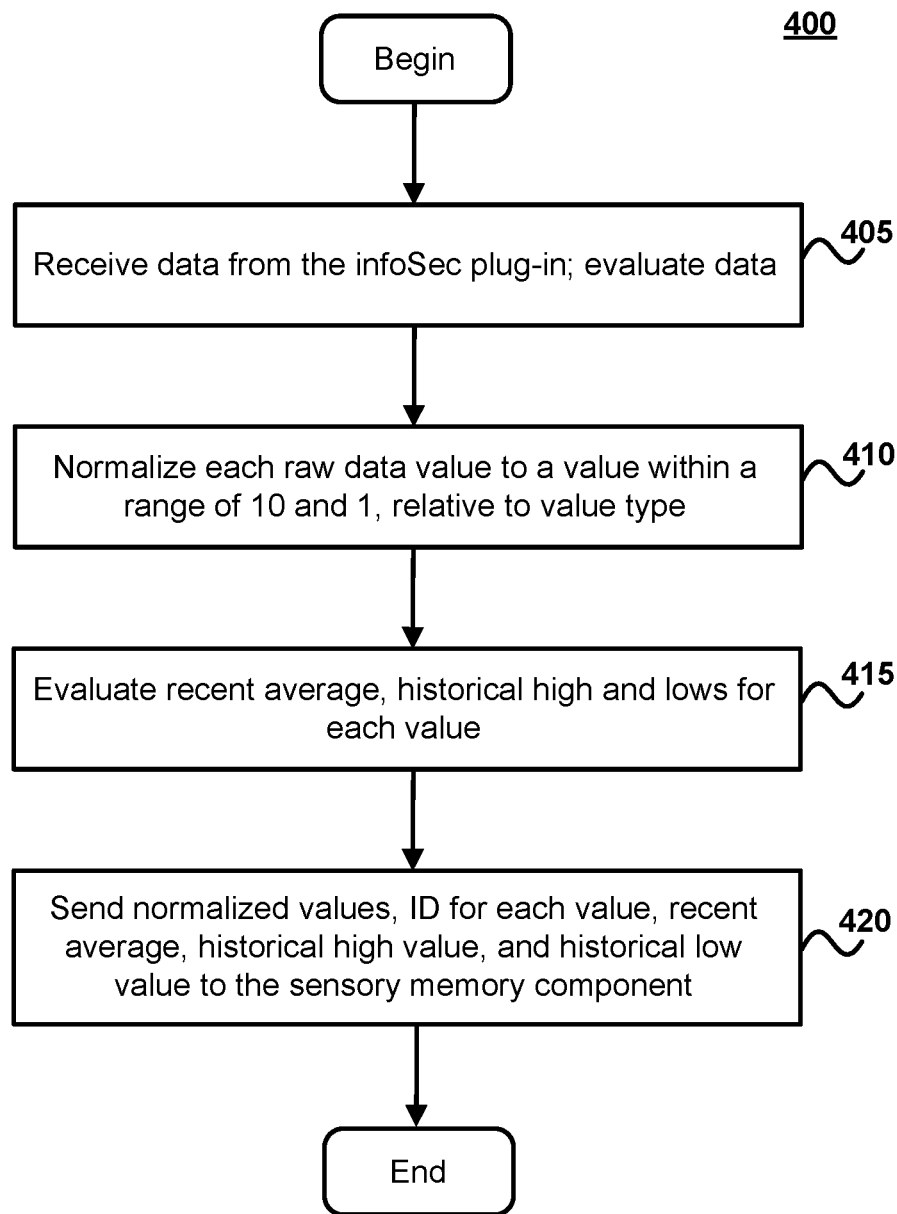
FIG. 4 illustrates a method for normalizing data sent by an information security plug-in to an information security driver in the behavior recognition system, according to one embodiment.

FIG. 4 illustrates a method 400 for normalizing data sent by an information security plug-in to the information security driver 210 in the behavior recognition system 115, according to one embodiment.

At step 405, the information security driver 210 receives data 205 from the information security plug-in 108. The information security plug-in 108 sends data to the information security driver 210 at pre-determined intervals (e.g., once every three seconds). The data may originate from several sources, such as IP address tables, security tool alerts, access logs, etc.

At step 410, the information security driver 210 normalizes raw data to a numerical value within a range from 0 to 1 relative to the source type. For example, values associated with IP address information are normalized from 0 to 1 relative to other IP address information values.

After normalizing the values, at step 415, the information security driver 210 evaluates additional statistics to associate with each value, such as a recent average and historical high and low values for each of the values. The information security driver 210 may use such values to readjust normalization techniques in the event the information security plug-in 108 is modified.

At step 420, the information security driver 210 sends a vector containing the normalized information security data to the sensory memory component 135. As stated, the sensory memory component 135 stores the normalized values and associated data. The neuro-linguistic module 205 may then retrieve the normalized values from the sensory memory component 135 and generate a linguistic model of the normalized information security data thereafter.

Figure 5:
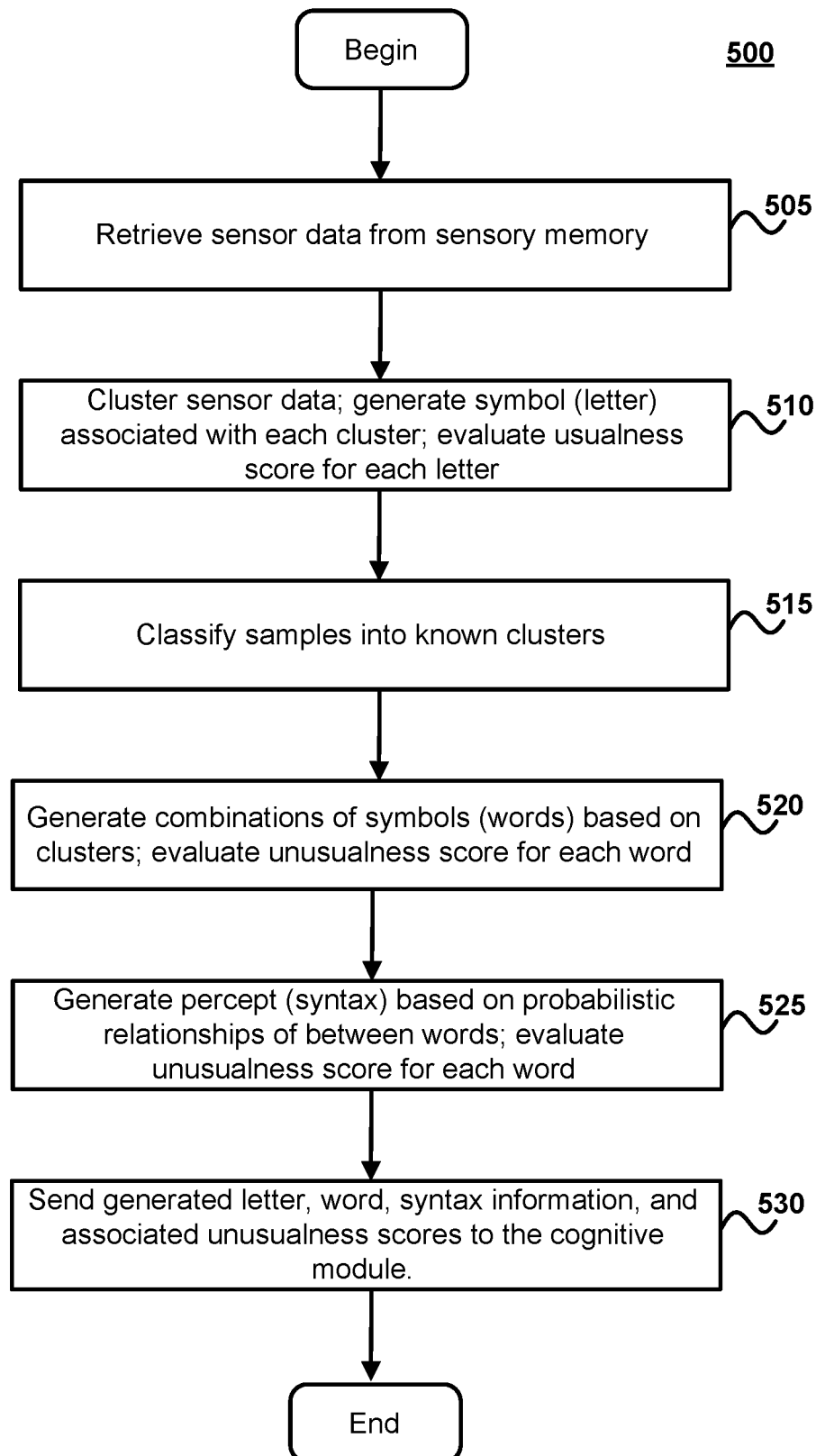
FIG. 5 illustrates a method for generating a linguistic representation of normalized information security data, according to one embodiment.

FIG. 5 illustrates a method 500 for generating a linguistic model of normalized sensor data, according to one embodiment. At step 505, the DTM component 316 receives the normalized vectors of traffic of an enterprise network from sensory memory 135.

At step 510, the classification analyzer component 317 clusters the normalized values based on values recurring in association with one another. In addition, the mapper component 318 generates symbols to associate with each cluster. The mapper component 318 also evaluates the frequency that each symbol occurs in the ordered input data stream. Thereafter, the mapper component 318 determines a unusualness score for each symbol. The mapper component 318 continues to identify symbols and evaluate statistical frequencies of the identified symbols until the mapper component 318 reaches a mature state (e.g., identified a certain number of symbols), so that the lexical analyzer component 319 may reliably identify a lexicon, i.e., a dictionary, based on the symbols. In practice, a minimum threshold of approximately a hundred thousand symbols has shown to be effective.

At step 515, the lexical analyzer component 319 generates words, i.e., combinations of symbols. To do so, the lexical analyzer component 319 identifies repeating patterns and sub-patterns of symbols and calculates frequencies at which each pattern occurs throughout the ordered input symbol stream. Further, the lexical analyzer component 319 determines an unusualness score for each word based on the calculated frequencies. The lexical analyzer component 319 continues to identify words and evaluate statistical frequencies of the identified words until reaching a mature state (e.g., a minimum amount of statistically relevant words have been identified for the dictionary).

At step 520, the PAM component 320 generates a percept (syntax) of the identified words based on probabilistic relationships of the words. Further, the PAM component 320 calculates frequencies of phrases occurring in the data. Doing so allows the PAM component 320 to determine an unusualness score for each phrase based on the frequencies. The PAM component 320 continues to identify words and evaluate statistical frequencies of the identified words until reaching a mature state (e.g., a specified amount of data has been observed).

At step 525, the PAM component 320 sends the generated symbol, word, and phrase data, along with the respective unusualness scores to the cognitive module 325. The cognitive module 325 performs learning analysis on the linguistic content delivered to semantic memory 330 (i.e., the identified symbols, words, phrases) by comparing new observations to the learned patterns kept in semantic memory 330 and then estimating the rareness of these new observations.

Further, the anomaly detection component 350 evaluates the unusualness scores of each of the symbols, words, and phrases to identify abnormal occurrences in the observed data. Once an anomalous observation has been identified, the anomaly detection component 350 may issue an alert (e.g., notify an administrator or user of the behavior recognition system 115).

One embodiment of the present disclosure is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM or DVD-ROM disks readable by an optical media drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present disclosure, are embodiments of the present disclosure. Other examples media include communications media through which information is conveyed to a computer, such as through a computer or telephone network, including wireless communications networks.

In general, the routines executed to implement the embodiments of the present disclosure may be part of an operating system or a specific application, component, program, module, object, or sequence of instructions. The computer program of the present disclosure is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the disclosure. However, it should be appreciated that any particular program nomenclature that follows is used merely for convenience, and thus the present disclosure should not be limited to use solely in any specific application identified and/or implied by such nomenclature.

While the foregoing is directed to embodiments of the present disclosure, other and further embodiments of the disclosure may be devised without departing from the basic scope thereof, and the scope thereof is determined by the claims that follow.

In sum, embodiments presented herein disclose techniques for analyzing an ordered input stream of data sent by one or more networked computer systems to a behavior recognition system. Once deployed on a computer network, the behavior recognition system identifies and learns patterns of behavior. As a result, the behavior recognition system, after time, is able to detect anomalous behavior occurring within the network based on previously observed activities. Therefore, advantageously, the behavior recognition system can readily notify a system administrator to attacks and other suspicious activity without having to configure the system with pre-defined attack signatures and the like.

While the foregoing is directed to embodiments of the present disclosure, other and further embodiments of the disclosure may be devised without departing from the basic scope thereof, and the scope thereof is determined by the claims that follow.

The invention claimed is:

1. A method, comprising:
   receiving, at a processor, a first ordered stream of normalized values associated with information security data for a computer network;
   generating a stable neuro-linguistic model by:
      clustering the first ordered stream of normalized values to form a plurality of clusters,
      outputting an ordered sequence of letters based on the plurality of clusters,
      building a dictionary of words based on the ordered sequence of letters, each word from the dictionary of words having a length from a plurality of lengths, each length from the plurality of lengths being less than or equal to a specified maximum letter length,
      outputting an ordered stream of words based on the ordered sequence of letters, and
      generating a plurality of phrases based on the ordered stream of words;
   detecting, using a codelet template, a pattern in a linguistic representation of the information security data, the linguistic representation of the information security data including at least one of the ordered sequence of letters, the ordered stream of words, or the plurality of phrases;
   receiving a second ordered stream of normalized values associated with the information security data for the computer network; and
   issuing an alert based on the stable neuro-linguistic model, the pattern, and the second ordered stream of normalized values.

2. The method of claim 1, wherein the information security data includes one of security log data, disk mount data, physical access data, disk input/output log data, internet protocol (IP) address log data, security tool data, memory usage data, routing data, packet traffic data, datagram traffic data, segment traffic data, port traffic data, or Simple Network Management Protocol (SNMP) trap data.

3. The method of claim 1, wherein each normalized value from the first ordered stream of normalized values is associated with a value of the information security data, the value for that normalized value from the first ordered stream of normalized values being normalized to a value within a range of 0 to 1, inclusive.

4. The method of claim 1, wherein the alert is indicative of a detected anomaly.

5. The method of claim 1, wherein issuing the alert includes sending alert data to an output device for display thereon.

6. A non-transitory computer-readable storage medium storing processor-executable instructions to:
receive a first ordered stream of values associated with information security data for a computer network;
generate a stable neuro-linguistic model by:
clustering the first ordered stream of values to form a plurality of clusters,
outputting an ordered sequence of symbols based on the plurality of clusters,
outputting an ordered stream of symbol combinations based on the ordered sequence of symbols, and
generating a plurality of phrases based on the ordered stream of symbol combinations;
detect a pattern in a linguistic representation of the information security data, the linguistic representation of the information security data including at least one of the ordered sequence of symbols, the ordered stream of symbol combinations, or the plurality of phrases;
receive a second ordered stream of values associated with the information security data for the computer network, the second ordered stream of values including Simple Network Management Protocol (SNMP) trap data; and
issue an alert to at least one compute device within the computer network based on the stable neuro-linguistic model, the pattern, and the second ordered stream of values.

7. The non-transitory computer-readable storage medium of claim 6, wherein the first ordered stream of values is received from a first compute device of the computer network, and the second ordered stream of values is received from a second compute device of the computer network, the second compute device different from the first compute device.

8. The non-transitory computer-readable storage medium of claim 6, further comprising building a dictionary of words based on the ordered sequence of symbols, each word from the dictionary of words having a length from a plurality of lengths, each length from the plurality of lengths being less than or equal to a specified maximum length.

9. The non-transitory computer-readable storage medium of claim 6, wherein each value from the first ordered stream of values is associated with a value of the information security data.

10. The non-transitory computer-readable storage medium of claim 6, wherein the alert is indicative of a detected anomaly.

11. The non-transitory computer-readable storage medium of claim 6, wherein issuing the alert includes sending alert data to an output device for display thereon.

12. The non-transitory computer-readable storage medium of claim 6, wherein the processor-executable instructions to generate the stable neuro-linguistic model include instructions to generate a syntax based on probabilistic relationships between the symbol combinations.

13. A system, comprising:
a processor; and
a memory storing instructions executable by the processor to:
receive, at the processor, a first ordered stream of values associated with information security data for a computer network;
generate a stable neuro-linguistic model by:
clustering the first ordered stream of values to form a plurality of clusters,
outputting an ordered sequence of letters based on the plurality of clusters,
building a dictionary of words based on the ordered sequence of letters, each word from the dictionary of words having a length from a plurality of lengths, each length from the plurality of lengths being less than or equal to a specified maximum letter length,
outputting an ordered stream of words based on the ordered sequence of letters, and
generating a plurality of phrases based on the ordered stream of words;
detect, using a codelet template, a pattern in a linguistic representation of the information security data, the linguistic representation of the information security data including at least one of the ordered sequence of letters, the ordered stream of words, or the plurality of phrases;
receive a second ordered stream of values associated with the information security data for the computer network; and
issue an alert based on the stable neuro-linguistic model, the pattern, and the second ordered stream of values.

14. The system of claim 13, wherein the information security data includes one of security log data, disk mount data, physical access data, disk input/output log data, internet protocol (IP) address log data, security tool data, memory usage data, routing data, packet traffic data, datagram traffic data, segment traffic data, port traffic data, or Simple Network Management Protocol (SNMP) trap data.

15. The system of claim 13, wherein each value from the first ordered stream of values is associated with a value of the information security data.

16. The system of claim 13, wherein the alert is indicative of a detected anomaly.

17. The system of claim 13, wherein issuing the alert includes sending alert data to an output device for display thereon.

18. The system of claim 13, wherein the processor-executable instructions to generate the stable neuro-linguistic model include instructions to generate a syntax based on probabilistic relationships between the words.

* * * * *